M. O. GRISWOLD & T. BRIEGEL.
DUST COLLECTOR.
APPLICATION FILED FEB. 5, 1910.

978,739.

Patented Dec. 13, 1910.
2 SHEETS—SHEET 1.

Witnesses
J. S. Freeman

Inventors
Milton O. Griswold,
Theodore Briegel,
C. L. Parker
Attorney

M. O. GRISWOLD & T. BRIEGEL.
DUST COLLECTOR.
APPLICATION FILED FEB. 5, 1910.

978,739.

Patented Dec. 13, 1910.
2 SHEETS—SHEET 2.

Witnesses
J. S. Freeman.
B. P. Fishburne.

Inventors
Milton O. Griswold,
Theodore Briegel,
By
C. L. Parker
Attorney

UNITED STATES PATENT OFFICE.

MILTON O. GRISWOLD AND THEODORE BRIEGEL, OF ROCK ISLAND, ILLINOIS, ASSIGNORS TO GRISWOLD MANUFACTURING COMPANY, OF ROCK ISLAND, ILLINOIS, A CORPORATION OF ILLINOIS.

DUST-COLLECTOR.

978,739.  Specification of Letters Patent.  Patented Dec. 13, 1910.

Application filed February 5, 1910. Serial No. 542,223.

*To all whom it may concern:*

Be it known that we, MILTON O. GRISWOLD and THEODORE BRIEGEL, citizens of the United States, residing at Rock Island, in the county of Rock Island and State of Illinois, have invented certain new and useful Improvements in Dust-Collectors, of which the following is a specification.

Our invention relates to dust-collectors and more particularly to a dust-collector to be interposed between a suitable suction-pump and a pneumatic renovating-tool, such as is used for cleaning carpets, rugs, and the like.

An important object of our invention is to provide a dust-collector, which is compact in its construction and having parts which are readily removable for the purpose of cleansing the same.

A further object of our invention is to provide a device of the above character, embodying foraminous diaphragms, and means for introducing the air to the filter below the diaphragms.

The final object of our invention is to provide a dust-collector, which is comparatively simple of construction and highly proficient in fulfilling its function.

Our invention consists in the combination and arrangement of parts to be hereinafter described.

Figure 1:
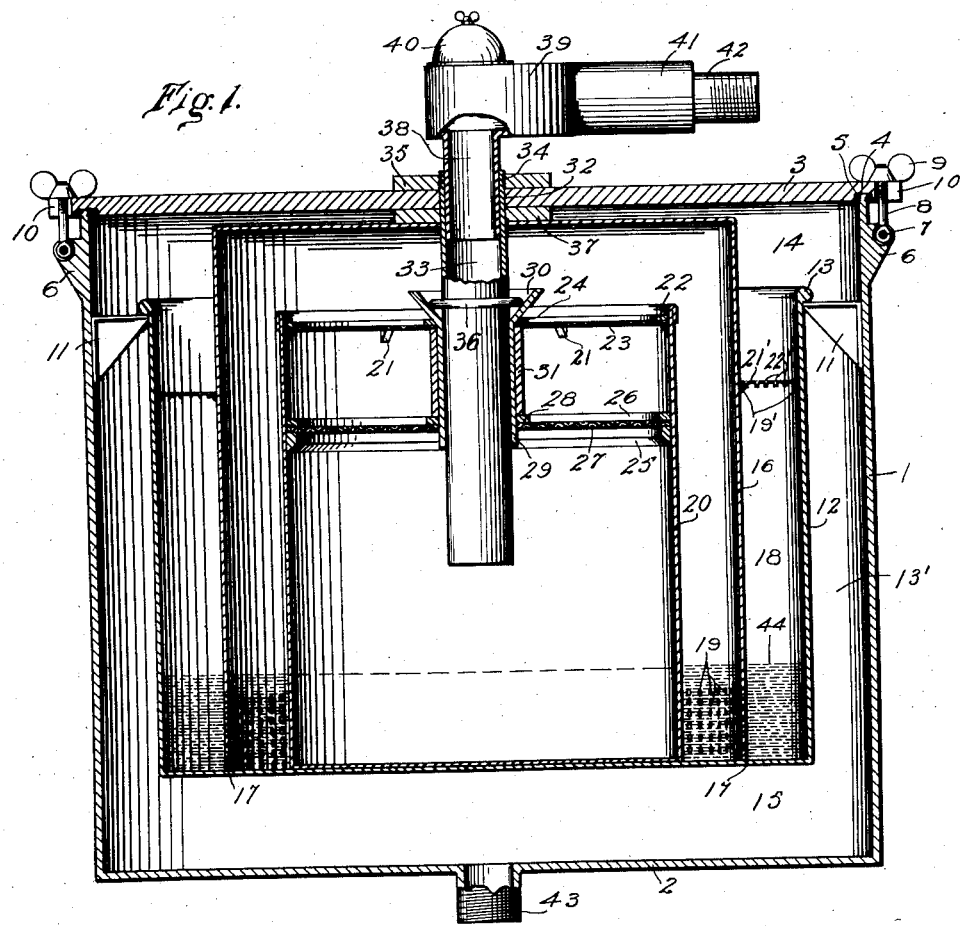
Figure 2:
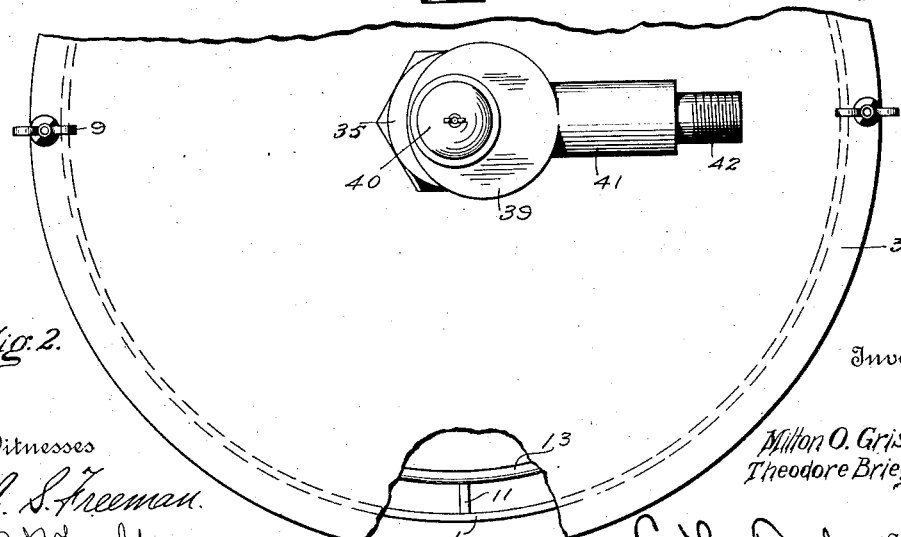
Figure 3:
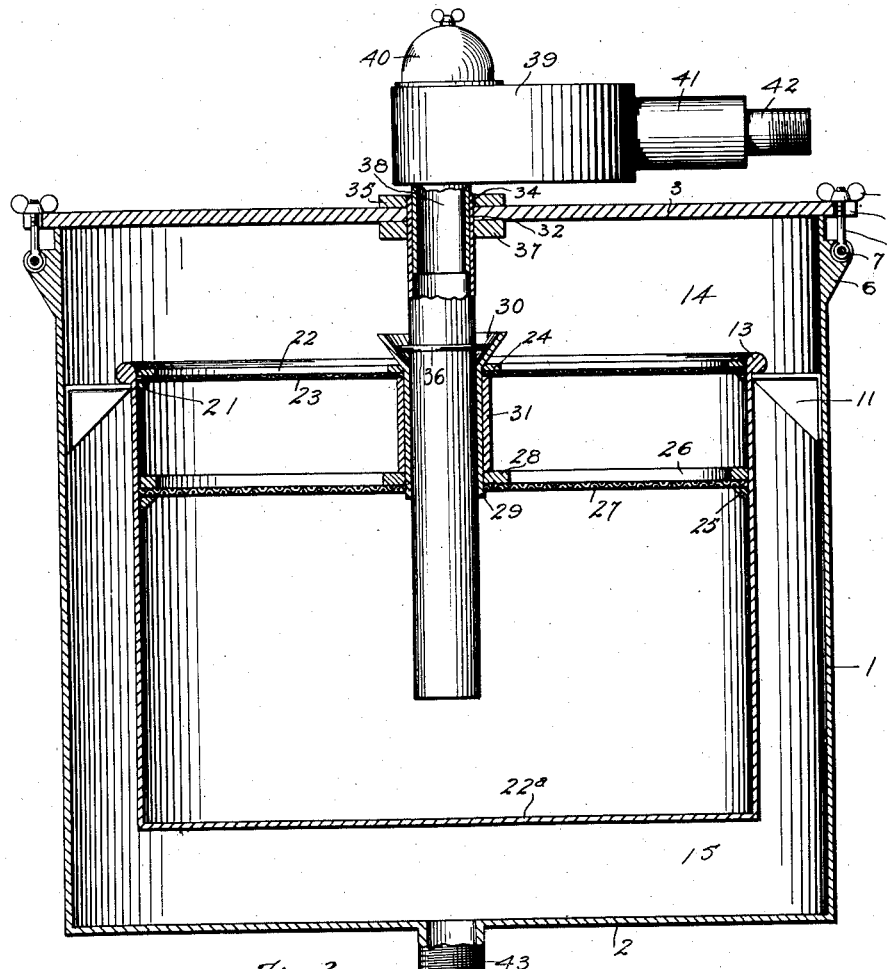

In the accompanying drawings forming a part of this specification, and in which like numerals are employed to designate like parts throughout the same, Figure 1 is a central vertical section through the dust-collector. Fig. 2 is a fragmentary plan view of the dust-collector. Fig. 3 is a central vertical section through a slightly modified form of the device, shown in Fig 1.

In the drawings illustrating a preferred embodiment of our invention, 1 designates an outer casing which forms a vacuum chamber and constitutes the body portion of the device, and which may be preferably made of sheet-metal. The casing is shown as being cylindrical and having its lower end closed by means of a bottom 2. The upper end of the casing 1 is formed open and is normally covered by a removable circular lid 3, which is provided upon its under side near its periphery, with an annular groove 4 for the reception of the upper end of the casing 1. Within the annular groove 4 is disposed suitable packing 5, whereby the lid 3 may have an air tight union with the casing 1. The casing 1 is provided upon its outer surface and near the upper end thereof, with diametrically arranged ears 6, which have pivotally mounted thereon as at 7, screw-threaded pins 8, which in turn carry thumb-nuts 9. The pins 8 are arranged to be inserted within diametrically disposed slots 10 formed upon the lid 3, and the thumb-nuts 9 may then be screwed up to clamp the lid 3 upon the casing 1. It is obvious that the thumb-nuts 9 may be freed from engagement with the lid 3, whereby said lid may be readily removed from the casing 1. Upon the inner surface of the casing 1 and near its upper end, are fixedly secured spaced brackets 11, which are diametrically arranged with relation to the casing 1.

Arranged concentrically within the casing 1, is a cylindrical cup-like sheet-metal water-receptacle 12, the upper open end of which is provided with an outwardly extending flange 13, which is seated upon the brackets 11. The receptacle 12 is much smaller than the casing and owing to the arrangement of this receptacle, there is formed an annular space 13' within the casing 1, which communicates with spaces 14 and 15 above and below said receptacle 12. Arranged concentrically within the receptacle 12 is an inverted cup-like receptacle 16, which is preferably cylindrical and made of sheet-metal. The inverted receptacle 16 has a much smaller diameter than receptacle 12 and the same is longer than receptacle 12. The lower open end of the inverted receptacle 16 is disposed upon the closed end of receptacle 12 as at 17, while the closed end of receptacle 16 extends upwardly beyond the open end of receptacle 12, and is adjacent the lid 3. It will thus be seen that an annular space 18 is provided between the receptacles 16 and 12. The inverted receptacle 16 is perforated adjacent its lower open end as at 19, below the water level of receptacle 12, for establishing communication with the receptacle 12. The receptacles 12 and 16 are provided upon their inner and outer sides respectively with annular ribs 19', which are in horizontal alinement and detachably support a metal ring 21', provided with a plurality of openings 22', which are punched downwardly upon the same.

Arranged concentrically within the inverted receptacle 16, is a sheet-metal cylindrical cup-like dust-collecting receptacle 20, which has a much smaller diameter and longitudinal axis than receptacle 16. The receptacle 20 is provided adjacent its upper end with spaced lugs 21, which lie in the same horizontal plane and serve to removably support a ring 22, to which is suitably secured a foraminous diaphragm 23, preferably formed of a closely woven fabric, such as muslin. The diaphragm 23 is provided at its center with an opening, and surrounding this opening is a ring 24 to which the diaphragm 23 is suitably secured. The outer ring 22 is to be of sufficient size to fit snugly within the receptacle 20, so that the same may not be displaced by pressure from below the diaphragm 23, while the ring 24 is prevented from displacement in a manner to be hereinafter described. Below and spaced away from the lug 21, the receptacle 20 is provided upon its inner side with an annular flange 25, adapted to removably support a ring 26 to which is suitably secured a foraminous diaphragm 27. The diaphragm 27 may preferably be formed of a closely woven metal fabric, and this diaphragm is provided at its center with an opening, which is surrounded by a ring 28, to which said diaphragm 27 is secured by suitable means. The ring 26 is of the proper size to fit snugly within the receptacle 20, and thereby be prevented from displacement by pressure from below. Disposed within the rings 24 and 28 is a tube 29, which is proveded at its upper end with a spreading mouth 30, which rests upon the ring 24 and prevents the upward displacement of the same. Surrounding the tube 29, below the mouth 30, is a sleeve 31, which retains the rings 24 and 28 in proper spaced relation to each other, and also prevents the upward displacement of the ring 28. It is to be understood that the tube 29 fits snugly within the sleeve 31, and said tube 29 may be withdrawn from the same when desired.

The lid 3 is provided centrally thereof, with an opening 32, adapted for the reception of a pipe 33, which extends through the tube 29 and terminates at a central point within the dust-collecting receptacle 20. The upper end of the pipe 33 is externally screw-threaded as at 34, for engagement with a nut 35 disposed upon the upper surface of the lid 3. The nut 35 is employed to prevent the downward displacement of the pipe 33, which is provided near its center with a flange 36, disposed within the mouth 30 of the tube 29, this flange 36 preventing the upward displacement of the tube 29. The pipe 33 also passes through a washer 37, which is disposed between the inverted receptacle 16, and the lid 3. Mounted to rotate and telescope within the pipe 33, is a pipe 38, which communicates with a cylindrical air chamber 39, having a sight opening upon its upper end, which is covered by a glass dome 40. The air chamber 39 has communicating therewith a pipe 41, provided with a screw-threaded reduced extension 42, for engagement with a hose or the like, connected to a suitable form of renovating-tool (not shown). The function of the glass dome 40 is to enable the operator to observe the air laden with dust, as the same is being drawn into the dust-separator. The closed end 2 of the casing 1, is provided centrally thereof with a screw-threaded pipe 43, which is to be connected by suitable means to a desired form of suction-pump (not shown).

In the modified form of our invention as illustrated in Fig. 3, the receptacles 12 and 16 are dispensed with and the receptacle 20, designated in Fig. 3 by 22ª is made sufficiently large to be supported by the brackets 11. The remainder of the structure of the modified form is precisely like the first form hereinabove described, and need not be again given.

In the operation of the preferred form of the device, a suitable liquid such as water is placed within the receptacle 12, this water being in sufficient amount to cover the perforated portion of the receptacle 16, as shown at 44. After suitable connections have been made with a renovating tool and suction pump, the dust-laden air is drawn into the receptacle 20 through the pipe 30. The dust-laden air is thus introduced into the receptacle 20 below the diaphragms 23 and 27 in a downward direction, which causes the larger particles carried by the dust-laden air to be thrown upon the bottom of the receptacle 20, and accordingly collected there. The dust-laden air is then drawn upwardly and by passing through the foraminous diaphragms 23 and 27 is deprived of the greater portion of the particles carried thereby. The air then travels downwardly within the receptacle 16 toward the perforations 19. The air then passes through the perforations 19, which are below the water level of receptacle 12 whereby the air is washed and deprived of all of its solid particles. The perforations 19 prevent undue agitation of the water while the air is passing through the same. The air then rises above the water within receptacle 12 and passes through the perforated plate 25, into the casing 1, or vacuum chamber, and then from said vacuum chamber into the pipe 43.

In the operation of the modified form of the device, as shown in Fig. 3, the dust-laden air is introduced through pipe 33 in a downward direction into the receptacle 20ª. The larger particles carried by the air are deposited upon the bottom of the receptacle 20ª and the dust-laden air then passes through the diaphragms 23 and 27 into the casing or vacuum chamber 1, and out of the same through pipe 43. In this form of the invention, the diaphragms 23 and 27 are relied upon to remove practically all of the dust from the air passing therethrough.

It is to be understood that certain changes may be made in the device, without departing from the spirit of the invention, as set forth in the appended claims.

Having fully described our invention, we claim:—

1. A device of the character described, comprising a vacuum chamber, a water-receptacle arranged therein, a receptacle arranged within said water-receptacle and provided with perforations below the water-line of said water-receptacle, and a filtering device arranged within said second named receptacle.

2. A device of the character described, a vacuum chamber, a water-receptacle arranged therein, an inverted receptacle arranged within said water-receptacle and perforated below the water-line of the same, a dust-collecting receptacle arranged within said inverted receptacle, a foraminous diaphragm arranged within said dust-collecting receptacle, and means for conducting air into said dust-collecting receptacle.

3. In a device of the character described, an outer casing forming a vacuum chamber, a water receptacle arranged within said outer casing, a perforated receptacle arranged within said water receptacle, a dust-collecting receptacle arranged within said perforated receptacle, and a foraminous diaphragm arranged within said dust-collecting receptacle.

4. In a device of the character described, an outer casing forming a vacuum chamber, a water receptacle removably supported within said outer casing, an inverted perforated receptacle arranged within said water receptacle and removable therefrom, a dust-collecting receptacle arranged within said inverted receptacle and removable therefrom, a foraminous diaphragm removably mounted within said dust-collecting receptacle, means for conducting air into said dust-collecting receptacle, and means for conducting air out of the outer casing.

5. In a device of the character described, an outer casing forming a vacuum chamber, a water receptacle arranged within said outer casing, a dust-collecting receptacle arranged within said water receptacle, straining means arranged within said dust-collecting receptacle, means for causing air to travel downwardly and upwardly within said water receptacle when passing from the dust collecting receptacle to within the outer casing, means for directing air into said dust collecting receptacle, and discharge means for said outer casing.

6. In a device of the character described, a water receptacle, means to exhaust air from the same, a dust collecting receptacle arranged within said water receptacle, straining means arranged within said dust collecting receptacle, means to cause the air leaving the dust collecting receptacle to travel downwardly and upwardly within the water receptacle to pass below the water level of said water receptacle, and means to direct air into said dust collecting receptacle.

7. In a device of the character described, a water receptacle, a perforated receptacle arranged therein, a dust collecting receptacle arranged within said perforated receptacle, straining means arranged within said dust collecting receptacle, means to introduce air into said dust-collecting receptacle, and means to exhaust air from said water receptacle.

8. In a device of the character described, a water receptacle, means to exhaust air from the same, a dust collecting receptacle arranged within the water receptacle, a third receptacle arranged within said water receptacle and surrounding the dust collecting receptacle to cause air leaving the dust collecting receptacle to pass below the water level of said water receptacle, and means to supply air to be strained to within said dust collecting receptacle.

In testimony whereof we affix our signatures in presence of two witnesses.

MILTON O. GRISWOLD.
THEODORE BRIEGEL.

Witnesses:
B. J. MITCHELL,
G. S. CHAMBERLIN.